(12) United States Patent
Yang et al.

(10) Patent No.: US 11,282,512 B2
(45) Date of Patent: Mar. 22, 2022

(54) AUTOMATIC GRAMMAR AUGMENTATION FOR ROBUST VOICE COMMAND RECOGNITION

(71) Applicant: QUALCOMM Incorporated, San Diego, CA (US)

(72) Inventors: Yang Yang, San Diego, CA (US); Anusha Lalitha, San Diego, CA (US); Jin Won Lee, San Diego, CA (US); Christopher Lott, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 156 days.

(21) Appl. No.: 16/665,177

(22) Filed: Oct. 28, 2019

(65) Prior Publication Data
US 2020/0135179 A1  Apr. 30, 2020

Related U.S. Application Data

(60) Provisional application No. 62/751,564, filed on Oct. 27, 2018.

(51) Int. Cl.
*G10L 15/187* (2013.01)
*G10L 15/06* (2013.01)
(Continued)

(52) U.S. Cl.
CPC ............ *G10L 15/187* (2013.01); *G06F 3/167* (2013.01); *G10L 15/02* (2013.01); *G10L 15/063* (2013.01);
(Continued)

(58) Field of Classification Search
CPC ...................................................... G06F 3/167
(Continued)

(56) References Cited

U.S. PATENT DOCUMENTS 6,501,833 B2 * 12/2002 Phillips ................... G10L 15/06
 379/88.07
6,606,597 B1 * 8/2003 Ringger ................ G06F 40/284
 704/270

(Continued)

OTHER PUBLICATIONS

Pfau et al. "Speaker Normalization and Pronunciation Variant Modeling: Helpful Methods for Improving Recognition of Fast Speech". 6th European Conference on Speech Communication and Technology (EUROSPEECH'99), Budapest, Hungary, Sep. 5-9, 1999 (Year: 1999).*

(Continued)

*Primary Examiner* — Jesse S Pullias
(74) *Attorney, Agent, or Firm* — Holland & Hart LLP (57) ABSTRACT

Various embodiments include methods and devices for implementing automatic grammar augmentation for improving voice command recognition accuracy in systems with a small footprint acoustic model. Alternative expressions that may capture acoustic model decoding variations may be added to a grammar set. An acoustic model-specific statistical pronunciation dictionary may be derived by running the acoustic model through a large general speech dataset and constructing a command-specific candidate set containing potential grammar expressions. Greedy based and cross-entropy-method (CEM) based algorithms may be utilized to search the candidate set for augmentations with improved recognition accuracy.

22 Claims, 8 Drawing Sheets

(51) Int. Cl.
*G10L 15/22* (2006.01)
*G10L 15/19* (2013.01)
*G10L 15/07* (2013.01)
*G06F 3/16* (2006.01)
*G10L 15/02* (2006.01)

(52) U.S. Cl.
CPC .............. *G10L 15/07* (2013.01); *G10L 15/19* (2013.01); *G10L 15/22* (2013.01)

(58) Field of Classification Search
USPC .................................. 704/231–257, 270–275
See application file for complete search history.

(56) References Cited

U.S. PATENT DOCUMENTS

| | | | | |
|---|---|---|---|---|
| 2005/0027527 | A1* | 2/2005 | Junkawitsch | G10L 15/20 704/243 |
| 2008/0059185 | A1* | 3/2008 | Chung | G10L 15/142 704/256 |
| 2010/0312550 | A1* | 12/2010 | Lee | G10L 15/063 704/10 |
| 2014/0067394 | A1* | 3/2014 | Abuzeina | G10L 15/197 704/244 |
| 2014/0372122 | A1* | 12/2014 | Harsham | G06F 3/16 704/257 |
| 2016/0232894 | A1* | 8/2016 | Park | G10L 15/34 |
| 2017/0032779 | A1* | 2/2017 | Ahn | G10L 15/063 |
| 2017/0133007 | A1* | 5/2017 | Drewes | G06F 40/242 |
| 2018/0025721 | A1* | 1/2018 | Li | G06N 3/08 704/232 |
| 2019/0272819 | A1* | 9/2019 | Kim | G10L 15/285 |
| 2019/0279614 | A1* | 9/2019 | Ye | G10L 15/16 |

OTHER PUBLICATIONS

Chen et al. "Small-Footprint Keyword Spotting using Deep Neural Networks". 2014 IEEE International Conference on Acoustic, Speech, and Signal Processing (Year: 2014).*

Sainath et al. "Convolutional Neural Networks for Small-footprint Keyword Spotting". Sixteenth Annual Conference of the International Speech Communication Association, 2015 (Year: 2015).*

* cited by examiner

AUTOMATIC GRAMMAR AUGMENTATION FOR ROBUST VOICE COMMAND RECOGNITION

RELATED APPLICATIONS

This application claims the benefit of priority to U.S. Provisional Application No. 62/751,564 entitled "Automatic Grammar Augmentation for Robust Voice Command Recognition" filed Oct. 27, 2018, the entire contents of which are hereby incorporated by reference.

BACKGROUND

Voice recognition is an increasingly popular mechanism for users to interface with computing systems. Conventional voice recognition technology involves either extensive training of a user-specific voice recognition model or processing of voice audio data in remote servers that have sufficient computing power and memory to be able to recognize speech without prior user-specific training. However, such techniques are unsuitable for many applications and devices where prior user-specific training is not feasible, access to remote servers is unavailable, and/or insufficient memory is available to support large voice recognition models.

SUMMARY

Various aspects may include a method for automatic grammar augmentation that improves voice command recognition accuracy in systems with a small footprint acoustic model. In various aspects, alternative expressions may be added to the grammar set (also referred to as user-defined voice command set) that capture acoustic model decoding variations. An acoustic model-specific statistical pronunciation dictionary may be generated by running the acoustic model through a large general speech dataset, and then constructing a command-specific candidate set (i.e., an augmented grammar candidate set) containing potential grammar expressions. The potential grammar expressions may capture the consistent patterns and errors in the decoding of small footprint acoustic model induced by variations in pronunciation, pitch, tempo, accent, ambiguous spellings, and noise conditions. Greedy based and/or cross-entropy-method (CEM) based algorithms may be used to search for an augmented grammar candidate set with improved recognition accuracy utilizing a command-specific dataset.

Various aspects may include applying an acoustic model to a general speech dataset to generate a statistical pronunciation dictionary, generating an augmented grammar candidate set based on the statistical pronunciation dictionary and an original grammar set. The original grammar set may include voice commands to be recognized, and each element of the augmented grammar candidate set may include a variation of one of the voice commands to be recognized. Various aspects may further include determining a command recognition accuracy, a false-alarm rate, and a mis-detection rate for each element of the augmented grammar candidate set, and generating an augmented grammar set by adding one or more elements of the augmented grammar candidate set to the original grammar set.

In some aspects, applying an acoustic model to a general speech dataset to generate a statistical pronunciation dictionary may include obtaining a greedy decoding sequence for each utterance in the general speech dataset, calculating a minimum-edit-path of a corresponding ground-truth to the greedy decoding, and obtaining a mapping of each utterance to a corresponding maximum probability decoding.

In some aspects, applying an acoustic model to a general speech dataset to generate a statistical pronunciation dictionary may include obtaining one or more sequences from beam-searching algorithms, calculating a minimum-edit-path of a corresponding ground-truth to the obtained one or more sequences, and obtaining a mapping of each utterance to a corresponding maximum probability decoding.

In some aspects, determining a command recognition accuracy, a false-alarm rate, and a mis-detection rate for each element of the augmented grammar candidate set may include determining the command recognition accuracy for each element of the augmented grammar candidate set based on a command-specific data set, the command-specific data set comprising, for each element of the augmented grammar candidate set, an audio waveform and a corresponding target command, and determining the false-alarm rate for each element of the augmented grammar candidate set based on an out-of-domain data set comprising a set of utterances that do not correspond to any one of the voice commands to be recognized.

In some aspects, generating an augmented grammar set by adding one or more elements of the augmented grammar candidate set to the original grammar set may include selecting the one or more elements of the augmented grammar candidate set utilizing a method selected from one of a naïve greedy search, a greedy search with refinement, or a beam-search.

In some aspects, generating an augmented grammar set by adding one or more elements of the augmented grammar candidate set to the original grammar set may include selecting the one or more elements of the augmented grammar candidate set utilizing a cross entropy method.

Further aspects include a computing device having a memory and a processor coupled to the memory and configured to perform operations of any of the methods summarized above. Further aspects include a computing device having a memory and means for performing functions of any of the methods summarized above. Further aspects include a non-transitory, processor-readable medium having stored thereon processor-executable instructions configured to cause a processor to perform operations of any of the methods summarized above.

BRIEF DESCRIPTION OF THE DRAWINGS

The accompanying drawings, which are incorporated herein and constitute part of this specification, illustrate example aspects of various embodiments, and together with the general description given above and the detailed description given below, serve to explain the features of the claims.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

The term "computing device" is used herein to refer to any of a variety of computing devices including smartphones, mobile computing devices (e.g., tablets, laptops, wearable devices, etc.), cellular-based wireless hotspots, Internet of Things ("IoT") devices, desktops, workstations, serves, embedded systems of electromechanical systems (e.g., vehicles, industrial and agricultural machinery, medical devices, control systems, etc.), and the like. Wireless communication devices are also commonly referred to as user equipment (UE), mobile devices, and cellular devices. Computing devices may receive and/or transmit communications via a variety of wired and/or wireless communication networks, including wide area networks (e.g., mobile communication networks), local area networks (e.g., Wi-Fi, Bluetooth, etc.), geolocation networks (e.g., Global Positioning System (GPS)), personal area networks (e.g., Wireless USB, Bluetooth, ZigBee, etc.), near-field communication, etc.

Voice user interface (UI) is becoming a common feature of all types of devices, from smartphones to automobiles. Although there has been substantial improvement in speech recognition accuracy reported in the literature since the advent of deep neural network-based solutions, designing a robust voice UI system for low memory/power footprint embedded devices without a cloud-based back-end still remains a challenging problem. For example, many types of handheld electronic devices could benefit from voice UI. However, in instances in which the handheld electronic device may not be connected to the Internet and may have limited processing and memory capacity, speech recognition may not be feasible.

Compared to its cloud-based counterpart, on-device voice UI may be beneficial for several reasons even though the device may be limited by computation power, memory size, and power consumption. For example, there are less privacy concerns with on-device voice UI as user voice data need not be uploaded to the cloud. As another example, on-device voice UI reduces the latency as the functionality does not involve network access delay. As a further example, on-device voice UI usage is not restricted by internet availability, and can be applied in devices with no built-in communication module.

Various embodiments include methods for improving the recognition accuracy of an on-device voice UI system designed to respond to a limited set of pre-defined voice commands. Such on-device voice UI systems are commonly used in modern IoT/embedded devices such as Bluetooth speakers, portable camcorders, wearables, home appliances, portable music players, etc. In such devices, the commands available to a user may be few in number and very specific, such as "PLAY" and "STOP" for music players, "SYNCH," "UP VOLUME" and "DOWN VOLUME" for Bluetooth speakers, and "RUN" and "STOP" for some appliances. Various embodiments provide methods that are particularly well-suited for devices having a fixed audio front-end that needs to recognize a small predefined set of specific voice commands.

In general, there are two approaches to design a voice command recognition pipeline with a pre-defined set of voice commands. A first approach is illustrated in FIG. 1, and a second approach is illustrated in FIG. 2.

Figure 1:
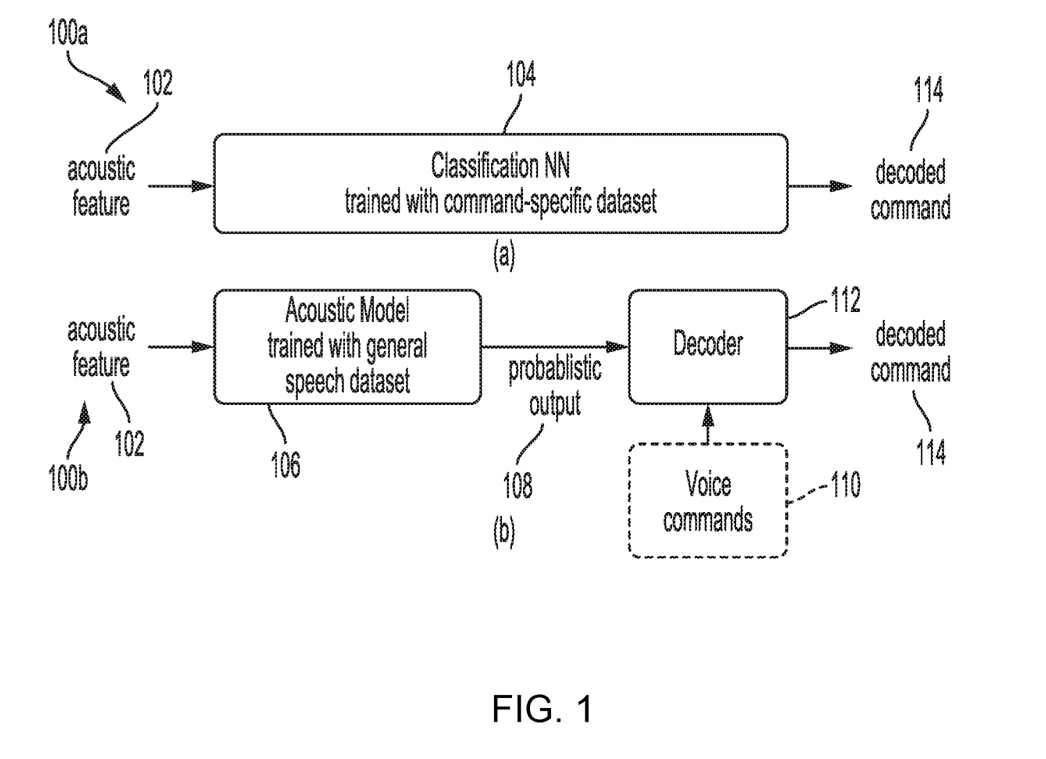
FIG. 1 is a block diagram illustrating two examples of approaches to design a voice command recognition pipeline according to various embodiments.
Figure 2:
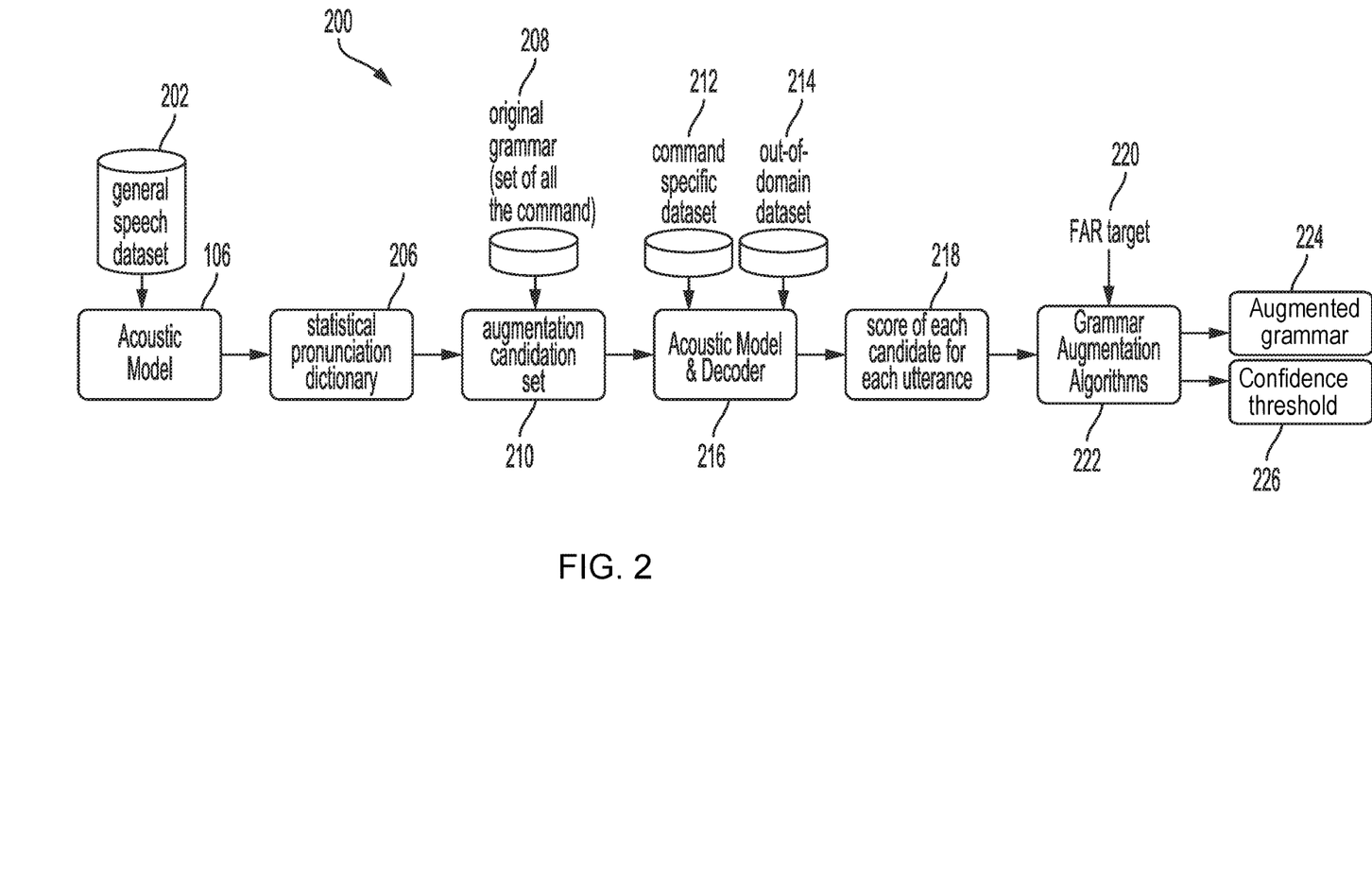
FIG. 2 is a block and process flow diagram illustrating an example of a grammar augmentation pipeline according to various embodiments.

In the first approach 100a illustrated in FIG. 1, a classification model 104 may directly map the acoustic features 102 of speech to the set of decoded voice commands 114. In such an approach, the classification model 104 may be trained with a command-specific dataset. Such a data set would include a large number of audio clips or acoustic features based on speech from many different people each correlated to a specific voice command. While this approach 100a may be feasible, the amount of memory required to provide a suitable recognition capability for the general population without training may be prohibitive for many devices.

In the second approach 100b, an acoustic model encoder 106 may convert the acoustic features 102 into phonetic/grapheme-based probabilistic output 108. In turn, a decoder 112 may map the probabilistic output 108 and voice commands 110 to the set of decoded voice commands 114. This approach 100b has the advantage of reducing the amount of memory required to achieve suitable recognition capabilities.

A state-of-the-art acoustic model may utilize any of a number of known acoustic models, such as one of a Connectionist Temporal Classification (CTC) model, a Recurrent Neural Network (RNN)-transducer model, or an Attention Model. Each model may generate probabilistic outputs 108, which are fed to a decoder 112 that generates the posterior probability of the corresponding phonetic or grapheme label. Even though these model architectures and training methodologies lead to satisfactory and even superhuman transcription accuracy, the best models obtained are often too large for deployment in small portable devices.

The classification model 104 used in the first approach 100a may not be a scalable approach as (i) training the model requires a large amount of command-specific audio data, which can be hard to obtain, and (ii) any change in the set of voice commands requires retraining of the model with an updated command-specific dataset. In contrast, the training of the acoustic model (a.k.a. acoustic encoder) 106 may be driven by a general speech dataset, which is more readily available, and any change in voice commands 100 only affects the decoder 112. Thus, various embodiments focus on the acoustic encoder-decoder pair architecture in the second approach 100b that is illustrated in FIG. 2.

Referring to FIG. 2, various embodiments may use a 200K parameter unidirectional-RNN-based acoustic model trained with CTC criterion using an acoustic data set, such as LibriSpeech and a few other datasets. The LibriSpeech corpus is a large (1000 hour) corpus of English read speech derived from audiobooks in the LibriVox project, sampled at 16 kHz. A 200K parameter unidirectional-RNN-based acoustic model may be used for training AI-based speech recognition algorithms. A unidirectional-RNN-based acoustic model outputs probabilities on grapheme targets. Due to the small model size, transcription accuracy of a 200K parameter unidirectional-RNN-based acoustic model is low. For example, the word-error-rate (WER) of a greedy decoding method (i.e., a method that takes the locally-optimal choice at each stage of iteratively comparing acoustic features to graphene targets) without any language model has been observed to be 48.6% on a LibriSpeech test-clean dataset. Various embodiments solve the problem of improving the command recognition accuracy of a small acoustic model trained with general speech dataset using limited command-specific data.

Table 1 below lists a few samples of the greedy decoding results from the 200K parameter acoustic model. Even though the word-error-rate is high, the error that acoustic model makes tends to be a phonetically plausible rendering of the correct word. For example, "pawed" is phonetically similar to the correct word "paused." Also, it is been observed that error patterns tend to be consistent across different utterances. Thus, for the recognition of a limited set of voice commands (a.k.a. grammar of the decoder), recognition accuracy may be improved by adding variations to original command set that capture common and consistent errors from the acoustic model. For the purposes of this application, the process of adding variations to the original grammar is referred to herein as "grammar augmentation." Various embodiments provide automatic and efficient grammar augmentation for voice UI applications.

TABLE 1

Greedy decoding samples from the 200K parameter acoustic encoder. Word errors are labeled in bold.

| acoustic model greedy decoding | Ground truth |
|---|---|
| the recter pawsd and den shaking his classto hands before him went on | the rector paused and then shaking his clasped hands before him went on |
| tax for wone o thease and itees he other | facts form one of these and ideas the other |

Various embodiments include the design of a candidate set of all grammar variations which captures common and consistent errors for a given acoustic model for any given set of original voice commands. Various embodiments also include methods for automated and fast evaluation of command recognition accuracy along with false-alarm and mis-detection rates for any augmented grammar set. Various embodiments also include methods and algorithms to automatically identify an improved augmented grammar set by suitably adding variations from the candidate set to the original grammar.

FIG. 2 illustrates an example of a pipeline 200 using methods according to various embodiments. Command decoding errors occur in instances in which the acoustic model output deviates from the ground truth to the extent that the voice UI can no longer successfully discriminate against other grammar sequences. By providing grammar augmentation, various embodiments may restore the discriminative power of the acoustic model by including in the grammar, the sequence variations that capture pronunciation variations or consistent acoustic model error patterns. To do that, various embodiments begin with generation of a candidate set containing meaningful variations.

Since the acoustic model 106 may be trained with CTC criterion, the acoustic model outputs may be interpreted as the transition probabilities. Each grapheme may be represented as a state in a decision trellis, which is a probabilistic graphical model for supervised learning on databases with categorical attributes. For a given utterance, based on acoustic model outputs, the decoder calculates the posterior probability (or an approximation of it) for each voice command within the limited set of voice commands, and picks the command with the maximum probability score (or pick none if all of them are below a detection threshold).

Ideally, the augmentation candidates capture consistent error patterns from the acoustic model, induced by variations in pronunciation, pitch, tempo, accent, ambiguous spellings, or even inherent mistakes made by the acoustic model. For example, if any command includes words that have homophones, those homophones may be added into the grammar. An acoustic model-specific statistical pronunciation dictionary 206 may be used to capture these word-level variations. First a large general speech dataset (e.g., the training set of the acoustic model) 202 may be run through the acoustic model 106. For each utterance, the greedy decoding sequence may be obtained by outputting the character with the maximum probability at each time frame, followed by an operation that removes repetitions. Given that most utterances from a general speech dataset correspond to a sentence rather than a single word, a Levenshtein distance algorithm may be used to find the minimum-edit-path of the ground-truth to the decoding. The Levenshtein distance is a string metric for measuring the difference between two sequences. By doing so, a mapping of each word to its corresponding maximum probability decoding may be obtained. For each word, statistics regarding the frequencies of its maximum-probability decoding outputs may be gathered. The following table lists a few entries from the dictionary obtained using a 200K-parameter acoustic model.

| set | | pause | | two | |
|---|---|---|---|---|---|
| set | 32.2% | pause | 15.7% | to | 53.3% |
| said | 16.6% | pose | 14.9% | two | 34.7% |
| sat | 11.4% | pase | 7.68% | do | 1.0% |
| said | 8.15% | porse | 7.31% | tu | 0.7% |
| sed | 4.71% | pas | 7.31% | too | 0.3% |

Utilizing this statistical dictionary 206, a candidate set 210 containing potential grammar variations may be built by repeatedly replacing each word in the original grammar 208 (i.e., the anticipated words to be spoken to implement a command (c) as listed in the second column in the table below) by its top-k likely max-decoding outputs (i.e., what the decode may output based on the detected speech as shown in the third column of the table below). For example, the voice UI application for a small Bluetooth player may utilize the following five voice commands forming the original grammar.

| command (c) | original grammar | candidate set for grammar augmentation ($\mathcal{G}$) |
|---|---|---|
| play music | play music | pla music, ply music, play mesic, . . . |
| stop music | stop music | stap music, stup music, stup mesic, . . . |
| pause music | pause music | pose music, pase mesic, pause mesic, . . . |
| previous song | previous song | previs song, previous son, . . . |
| next song | next song | nex song, lext song, nex son, . . . |

By looking up in the statistical pronunciation dictionary 206 the words contained in the original grammar 208, an array of alternate expressions for the original commands may be formed as shown above. For each command, the set of candidates is the cartesian product of the top-k decoding list from the statistical pronunciation dictionary 206 for each of the words in the command. The value of k can be different for different words, and may be chosen to capture at least a certain fraction of all the variations.

For ease of reference in the the following description of the process in blocks 208-222, the set of commands 208 is denoted as C, the set of all grammar candidates in the augmented candidate set 210 is denoted as $\mathcal{G}$, and the mapping function from $\mathcal{G}$ to C is denoted as f. A grammar G is a subset of $\mathcal{G}$. A command-specific dataset 212 may contain audio waveforms and the corresponding target commands for the purpose of evaluating the recognition accuracy of any grammar Such a dataset is denoted as (u, t)$\in$ D with u and t denoting an utterance and its corresponding target command. An out-of-domain dataset 214 denoted as u $\in D_{ood}$ that contains sound waves that do not correspond to any valid commands, and thus do not have the target t, may be used to evaluate the false alarm rate (FAR).

As mentioned before, the acoustic decoder 216 compares the posterior probabilities $\mathbb{P}$ (g|u) of all the grammar candidates g included in the grammar set G$\subseteq\mathcal{G}$ given the audio waveform 14, and outputs the command f(g*) where g*=arg $\max_{g\in G}\mathbb{P}$ (g|u). For an acoustic model trained with CTC criterion, this calculation may be done by running a forward-only dynamic programming algorithm on the acoustic model output. In order to avoid having to repeat the calculation of the probability scores for every choice of grammar set G$\subseteq\mathcal{G}$, the method may pre-compute and store the probability scores 218 for all the candidate grammar, as well as all the utterances in both command-specific dataset D 212 and out-of-domain dataset $D_{ood}$ 214. Precisely, as a pre-processing step of the grammar augmentation search algorithm, the following probability scores may be obtained:

$$\mathbb{P}_{(g|u)}, \forall g\in\mathcal{G}, \forall u\in\mathcal{D}\cup\mathcal{D}_{ood}.$$

To achieve a FAR target 220 of $\alpha$, the confidence threshold for the probability score can be computed as below:

$$p(G, \alpha) = \min_p \left\{ p : \frac{\left|\{u\in\mathcal{D}_{ood} : \min_{g\in G}\mathbb{P}(g|u) > p\}\right|}{|\mathcal{D}_{ood}|} < \alpha \right\}$$

The decoded command for an utterance u is:

$$d(G, \alpha, u) = \begin{cases} \phi, & \text{if } \max_{g\in G}\mathbb{P}(g|u) < p(G, \alpha), \\ \underset{c\in C}{\mathrm{argmax}}\max_{g\in G, f(g)=c}\mathbb{P}(g|u), & \text{otherwise} \end{cases}$$

where $\phi$ denotes decoding being out-of-domain.

The mis-detection-rate (MDR) and the mis-classification-rate (MCR) can be computed as below:

$$MDR(G, \alpha) = \frac{|\{(u, t)\in\mathcal{D} : d(G, \alpha, u) = \phi\}|}{|\mathcal{D}|},$$

$$MDR(G, \alpha) = \frac{|\{(u, t)\in\mathcal{D} : d(G, \alpha, u) \notin \{\phi, t\}\}|}{|\mathcal{D}|}.$$

The grammar augmentation algorithms 222 search for the grammar set G among all subsets of a candidate set $\mathcal{G}$ that minimizes a weighted sum of the mis-detection-rate and mis-classification-rate with a fixed false-alarm target $\alpha$, $$\min_{G\subseteq\mathcal{G}} MCR(G, \alpha) + \beta MDR(G, \alpha).$$

where the weight factor $\beta$ controls the significance of mis-detection versus mis-classification. By pre-computing the probabilities scores 218, the algorithms can run without invoking the acoustic model.

Adding candidates to the grammar to generate an augmented grammar 224 does not always improve performance. For example, by adding more candidates, the grammar set becomes more "accepting", which requires a larger confidence threshold $\rho$(G, $\alpha$) 226 to maintain the FAR target 220, potentially resulting in degraded mis-detection rate. As another example, distinguishability of the commands has a complex inter-dependency, hence adding grammar candidates for one command may reduce the recognition rate of other commands, as it may alter the classification boundary amongst the set of commands.

Various embodiments may use any of a variety of greedy optimization algorithms to assist in the generation of an augmented grammar candidate set 210. These greedy optimization algorithms may include one of three methods: a naïve greedy search method; a greedy search with refinement method; or a beam-search method. A greedy search algorithm makes a locally-optimal choice at each stage of an iterative analysis with the intent of finding a global optimum. A beam search is a heuristic search algorithm that explores a graph by expanding the most promising node in a limited set. Beam search is an optimization of best-first search that reduces its memory requirements. Best-first search is a graph search which orders all partial solutions (states) according to some heuristic. However, in beam search, only a predetermined number of best partial solutions are kept as candidates.

For a naïve greedy search, the method may start with the original grammar, iteratively go through all of the candidates from $\mathcal{G}$, and in each iteration, add the candidate that best improves the objective function until no candidate can improve further.

For a greedy search with refinement, every time a candidate is added to the grammar, those candidates among the remaining ones which contain the added candidate as a subsequence may be removed. For example, for pause music command, if candidate pase music is added to the grammar, then parse music is removed from subsequent iterations since pase is a subsequence of parse. Trimming the candidate set in this manner increases the diversity of variations in the grammar.

For a beam-search, which is a heuristic search algorithm that explores a graph by expanding the most promising node in a limited set, in each iteration a list of l best grammar sets is maintained. Beam-search degenerates to the naïve greedy algorithm when l=1.

In addition, an augmented grammar candidate set 210 may be generated using the Cross Entropy Method (CEM). The CEM is a widely used combinatorial optimization algorithm and has been successfully applied in some reinforcement learning problems. The main idea in CEM was developed for rare event sampling, as the algorithm tries to minimize the Kullback-Leibler (KL) divergence between a proposed sampling distribution and the optimal zero-variance importance sampling distribution. KL divergence (also called relative entropy) is a measure of how one probability distribution is different from a second, reference probability distribution (a KL divergence of 0 means that the two distributions are identical). Going back to the grammar augmentation objective function in Equation (2), the search space is the power set of the candidate set $\mathcal{G}$, which can be represented by $\{0,1\}^{|\mathcal{G}|}$, which is the set of all binary sequences with length $|\mathcal{G}|$, where $|.|$ indicates the cardinality of the set $\mathcal{G}$, with each grammar choice represented by a $|\mathcal{G}|$-dimensional binary vector.

Applying CEM algorithms, various methods may start with an initial probability distribution on $\{0,1\}^{|\mathcal{G}|}$ and iteratively tune the CEM algorithm parameters so that most of the probability mass is assigned in the region towards the minimization of the objective function. In some embodiments, the distribution on this discrete space maybe induced by the sign of a $|\mathcal{G}|$-dimensional independent Gaussian distribution, parameterized by their mean and variance in each dimension.

For each iteration, an embodiment method may start with a population of s samples from the current distribution, each representing a feasible candidate choice. The embodiment method may evaluate the objective function of MDR+ βMCR for each of sample candidate choice, and keep the best γ fraction. The embodiment method may then update the parameter of the distribution using the sample mean and variance of the top γ*s candidates (also called an elite set), and iterate the procedure by obtaining s samples from the updated distribution.

Figure 3:
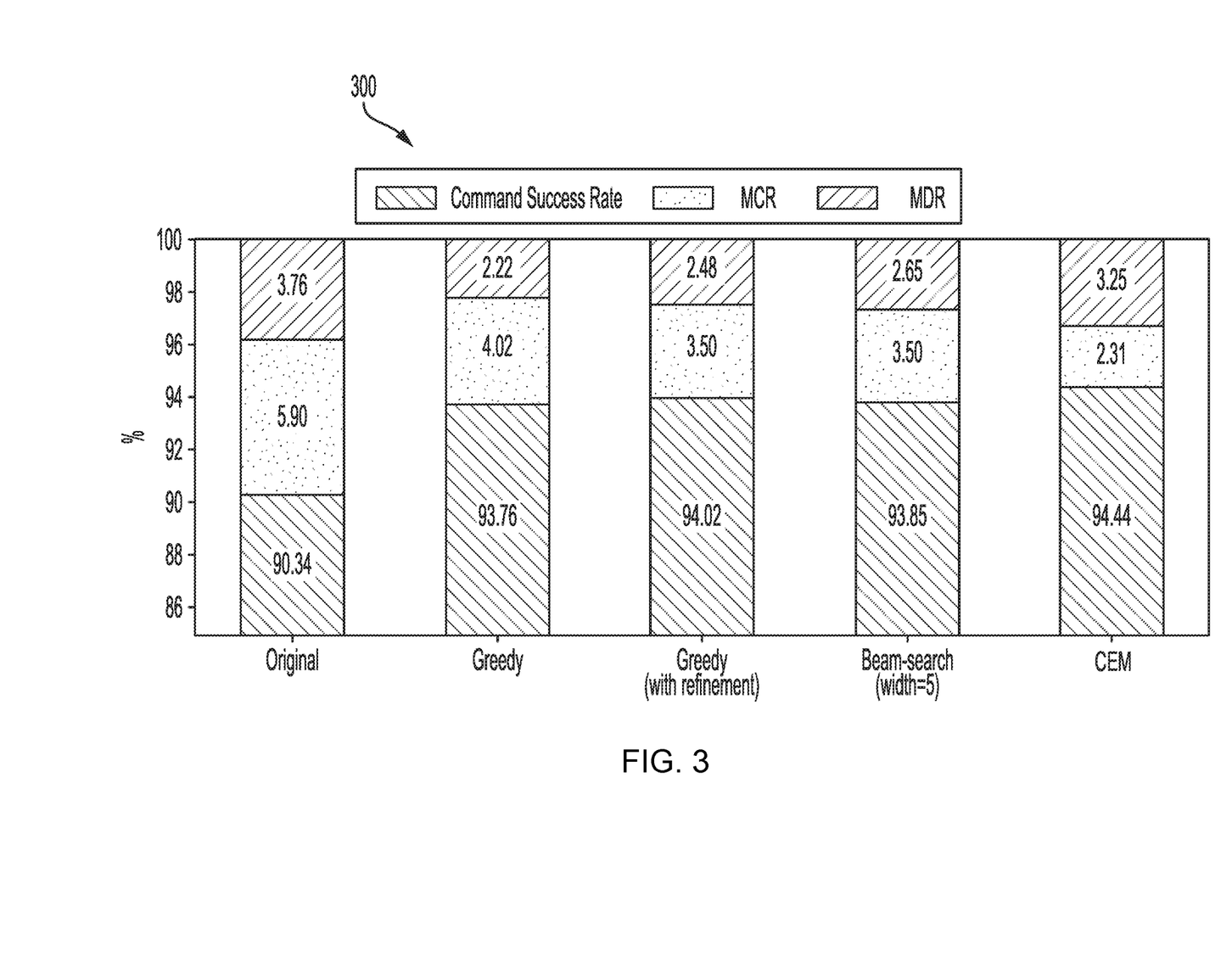
FIG. 3 is a chart illustrating example performances of grammar augmentation algorithms according to various embodiments.

The various grammar augmentation algorithms described above were evaluated with a FAR target of α=0.1%. FIG. 3 shows a table 300 illustrating comparison results of the command success rate and the decomposition of the error in terms of mis-detection and mis-classification. Note that CEM algorithm provides most improvement in command success rate unlike greedy-optimization based algorithms which may commit to sub-optimal grammar sets early on. As discussed previously, adding more variations naively to the grammar set makes it more accepting and may increase mis-detection errors. However, FIG. 3 shows that performing augmentation in a principled manner can greatly reduce the misclassification error without increasing the mis-detection errors.

Figure 4:
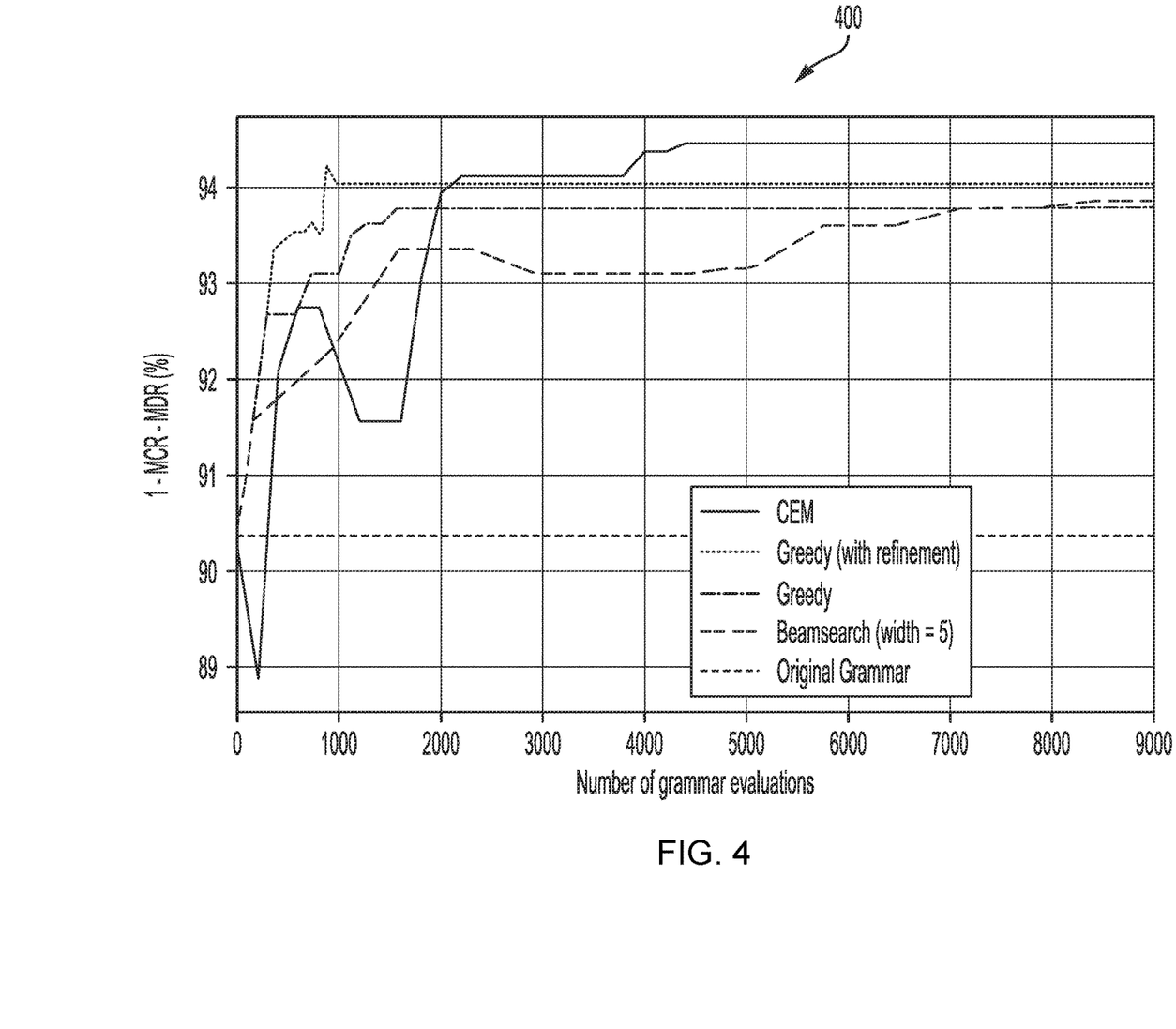
FIG. 4 is a graph illustrating an example of performance on a test set versus number of grammar evaluations according to various embodiments.

Evaluating MCR and MDR for any candidate grammar set may be computationally complex. Hence, the complexity of augmentation algorithms according to various embodiments may be measured in terms of number of grammar evaluations needed to output their best augmented grammar set 224. FIG. 4 is a graph 400 showing the variation and improvement in command success rate (1−MDR−MCR) as the number of grammar evaluations increases. Note that CEM takes only marginally more evaluations while providing the maximum reduction in MCR and MDR. While the beam-search method explores more and requires more grammar evaluations, it provides only marginally better improvement over the naïve greedy algorithm that selects a single best candidate. The greedy algorithm with refinement method reaches its best performance in the least number of grammar evaluations. This suggests that incentivizing diversity over exploration may provide better improvement in command success rate and in fewer evaluations.

The previous description used a candidate set size of 150 ($|\mathcal{G}|$=150). The complexity of the grammar augmentation algorithm may be reduced by reducing candidate set size. Table 2 shows the performance the augmentation algorithms for various candidate set sizes. In particular, the table shows that CEM improves consistently as the candidate set is increased.

| | 1-MDR-MCR (%) for different algorithms with different candidate set size $|\mathcal{G}|$. | | | |
|---|---|---|---|---|
| Candidate Set Size | Greedy | Greedy (refinement) | Beam-search (width 5) | CEM |
| 25 | 92.31 | 91.79 | 92.31 | 93.25 |
| 50 | 93.16 | 92.74 | 93.50 | 93.59 |
| 75 | 93.08 | 93.16 | 92.99 | 93.68 |
| 100 | 92.82 | 92.65 | 92.05 | 94.02 |
| 150 | 93.76 | 94.02 | 93.85 | 94.44 |

Figure 5:
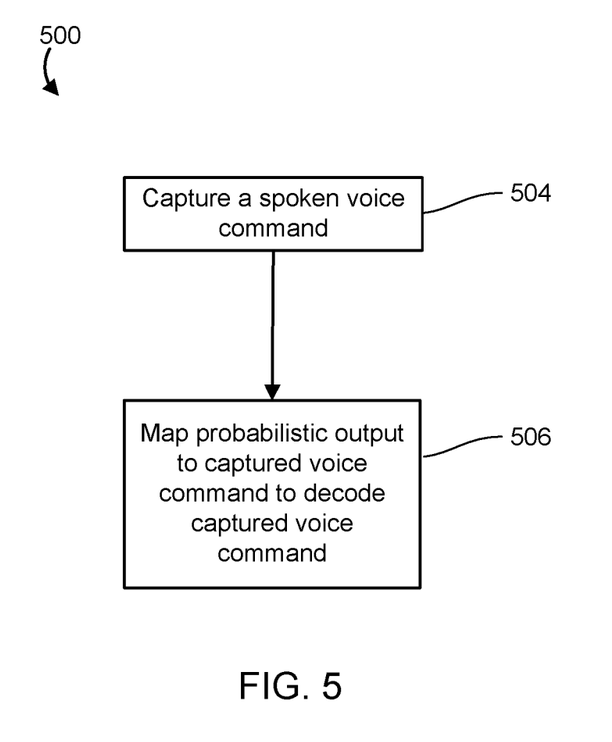
FIG. 5 is a process flow diagram illustrating an example method for automatic grammar augmentation for robust voice command recognition according to various embodiments.

FIG. 5 illustrates an example method 500 for recognizing voice commands in a device implementing voice command recognition according to various embodiments. The method 500 may be performed by a device processor configured with processor executable instructions to perform the operations.

In the method 500, the processor may convert acoustic features into probabilistic output to better match a captured spoken voice command to a most likely intended command Due to various factors, the command as spoken may result in captured audio that differs from audio corresponding to a target command. For example, while the target command may be "play music", the spoken command may be captured as "play musak." Such differences may be due to various factors including, but not limited to, variations in the user's pronunciation, pitch, tempo, accent, ambiguous spellings, inherent mistakes, etc. In various embodiments, acoustic features may include an audio waveform and/or other representation of an utterance of a word. In various embodiments, probabilistic output may include probabilities that acoustic features may correspond to one or more spoken commands in an augmented grammer set.

In block 504, the processor may capture a spoken voice command. For example, a user may issue a command into a microphone of the device that may record the spoken voice command.

In block 506, the processor may map the probabilistic output to the captured voice command using an augmented grammar 224 in order to decode the captured voice command. For example, if the spoken command is captured as "play musak," an augmented grammar may map the probabilistic output to this captured command and result in in decoding the voice input the command "play music."

Figure 6:
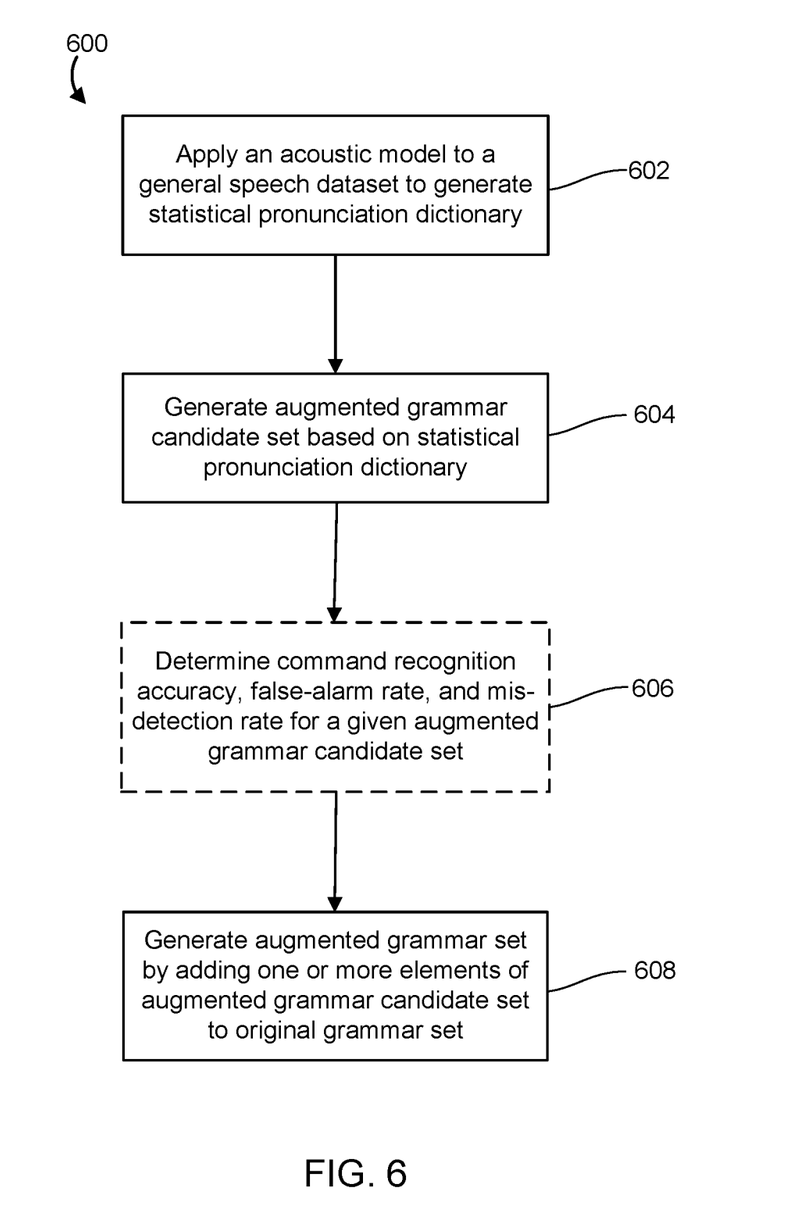
FIG. 6 is a process flow diagram illustrating an example method for converting acoustic features into probabilistic output according to various embodiments.

FIG. 6 illustrates an example of a method 600 of generating augmented grammar for use in a voice command recognition functionality. In various embodiments, the method 600 may implement the pipeline 200 described with reference to FIG. 2 to generate the augmented grammar used in the method 500. The method 600 may be performed by a processor of a computing device configured with processor executable instructions to perform the operations.

In block 602, the processor may apply an acoustic model to a general speech dataset to generate a statistical pronunciation dictionary. In various embodiments, the acoustic model may be trained with CTC criterion and the outputs of the acoustic model may be transition probabilities. In various embodiments, the statistical pronunciation dictionary may represent consistent error patterns from the acoustic model induced by variations in pronunciation, pitch, tempo, accent, ambiguous spellings, and/or inherent mistakes. In some embodiments, the statistical pronunciation dictionary may include homophones of any target command. In various embodiments, each element in the statistical pronunciation dictionary may include a word and a corresponding maximum probability decoding.

In some embodiments the processor may apply an acoustic model to a general speech dataset to generate a statistical pronunciation dictionary in block 602 by obtaining a greedy decoding sequence for each utterance in the general speech dataset, calculating a minimum-edit-path of a corresponding ground-truth to the greedy decoding, and obtaining a mapping of each utterance to a corresponding maximum probability decoding.

In some embodiments the processor may apply an acoustic model to a general speech dataset to generate a statistical pronunciation dictionary in block 602 by obtaining one or more sequences from beam-searching algorithms, calculating a minimum-edit-path of a corresponding ground-truth to the obtained one or more sequences, and obtaining a mapping of each utterance to a corresponding maximum probability decoding.

In block 604, the processor may generate an augmented grammar candidate set based on the statistical pronunciation dictionary. In various embodiments, the augmented grammar candidate set may be generated by repeatedly replacing each word in an original grammar by the top-k likely max-decoding outputs of each word.

In some embodiments, in optional block 606, the processor may determine a command recognition accuracy, a false-alarm rate, and a mis-detection rate for a given augmented grammar candidate set. In various embodiments, a command recognition accuracy may be determined by the processor based on a command-specific dataset comprising an audio waveform for each corresponding command. In various embodiments, a false-alarm rate may be determined by the processor based on an out-of-domain dataset that contains a set of utterances that do not correspond to any target commands. In some embodiments, optional block 606 may include determining the command recognition accuracy for a given augmented grammar candidate set based on a command-specific data set, the command-specific data set comprising, for each element of the augmented grammar candidate set, an audio waveform and a corresponding target command, and determining the false-alarm rate for each element of the augmented grammar candidate set based on an out-of-domain data set comprising a set of utterances that do not correspond to any one of the voice commands to be recognized.

In block 608, the processor may generate an augmented grammar set by adding one or more elements of the augmented grammar candidate set to an original grammar set. That is, the augmented grammar set may include the original grammar set as well as one or more additional elements (i.e., command variations). In various embodiments, the processor may generate the augmented grammar set based on one or more algorithms including, but not limited to, a naïve greedy search, a greedy search with refinement, and/or a beam-search. In various embodiments, the processor may generate the augmented grammar set based on a cross entropy method. In some embodiments, the processor may select the one or more elements of the augmented grammar candidate set based on a weighted sum of the mis-detection rate determined in optional block 606 and a mis-classification rate for each element of the augmented grammar candidate set.

Figure 7:
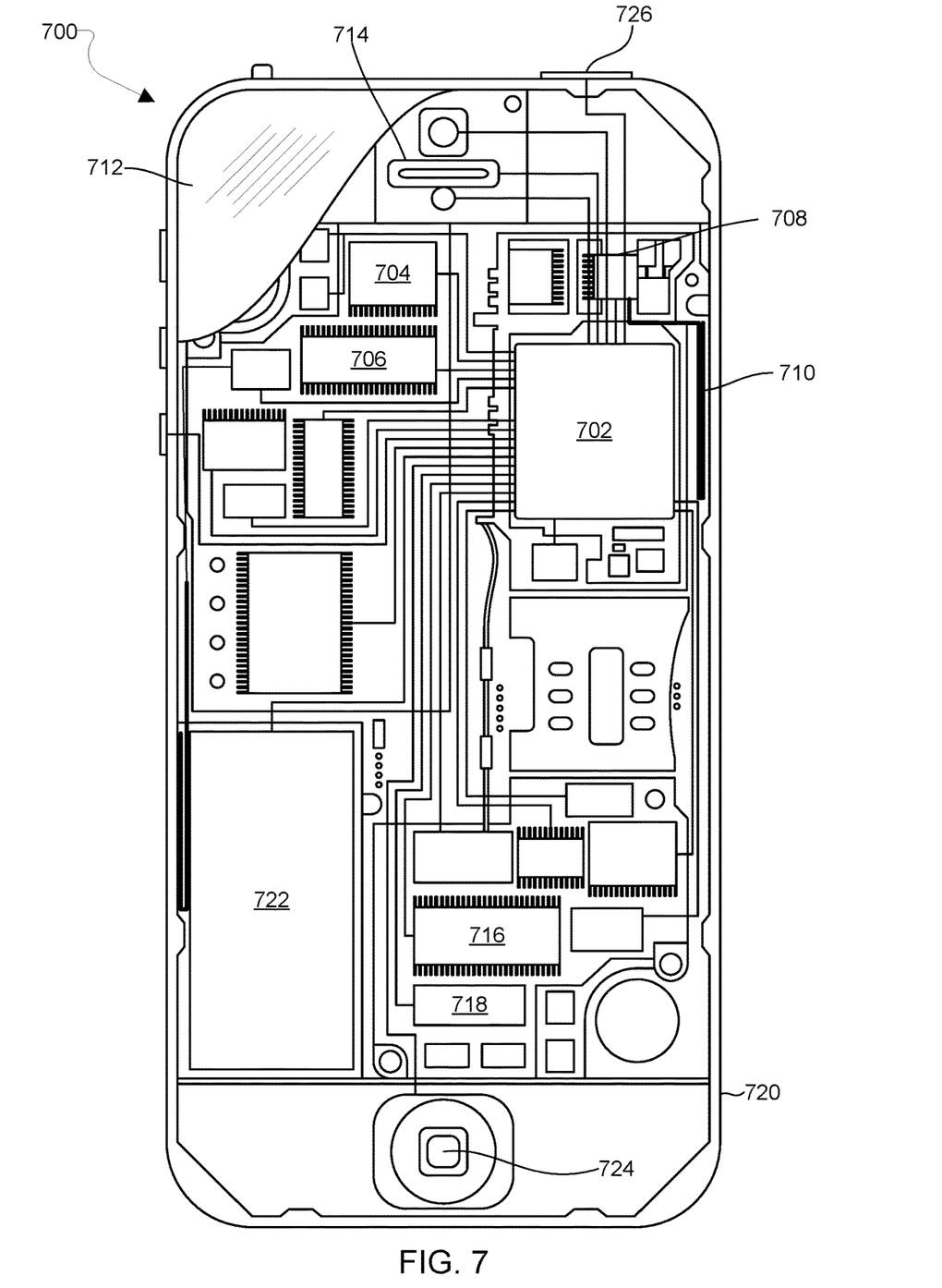
FIG. 7 is a component block diagram illustrating an example wireless communication device suitable for use with the various embodiments.

The various embodiments (including, but not limited to, embodiments described above with reference to FIGS. 1-6) may be implemented in a wide variety of computing systems including wireless communication devices, an example of which suitable for use with the various embodiments is illustrated in FIG. 7. The wireless communication device 700 may include a processor 702 coupled to a touchscreen controller 704 and an internal memory 706. The processor 702 may be one or more multicore integrated circuits designated for general or specific processing tasks. The internal memory 706 may be volatile or non-volatile memory and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 704 and the processor 702 may also be coupled to a touchscreen panel 712, such as a resistive-sensing touchscreen, capacitive-sensing touchscreen, infrared sensing touchscreen, etc. Additionally, the display of the computing device 700 need not have touch screen capability.

The wireless communication device 700 may have one or more radio signal transceivers 708 (e.g., Peanut, Bluetooth, ZigBee, Wi-Fi, RF radio) and antennae 710, for sending and receiving communications, coupled to each other and/or to the processor 702. The transceivers 708 and antennae 710 may be used with the above-mentioned circuitry to implement the various wireless transmission protocol stacks and interfaces. The wireless communication device 700 may include a cellular network wireless modem chip 716 that enables communication via a cellular network and is coupled to the processor.

The wireless communication device 700 may include a peripheral device connection interface 718 coupled to the processor 702. The peripheral device connection interface 718 may be singularly configured to accept one type of connection, or may be configured to accept various types of physical and communication connections, common or proprietary, such as Universal Serial Bus (USB), FireWire, Thunderbolt, or PCIe. The peripheral device connection interface 718 may also be coupled to a similarly configured peripheral device connection port (not shown).

The wireless communication device 700 may also include speakers 714 for providing audio outputs. The wireless communication device 700 may also include a housing 720, constructed of a plastic, metal, or a combination of materials, for containing all or some of the components described herein. The wireless communication device 700 may include a power source 722 coupled to the processor 702, such as a disposable or rechargeable battery. The rechargeable battery may also be coupled to the peripheral device connection port to receive a charging current from a source external to the wireless communication device 700. The wireless communication device 700 may also include a physical button 724 for receiving user inputs. The wireless communication device 700 may also include a power button 726 for turning the wireless communication device 700 on and off.

Figure 8:
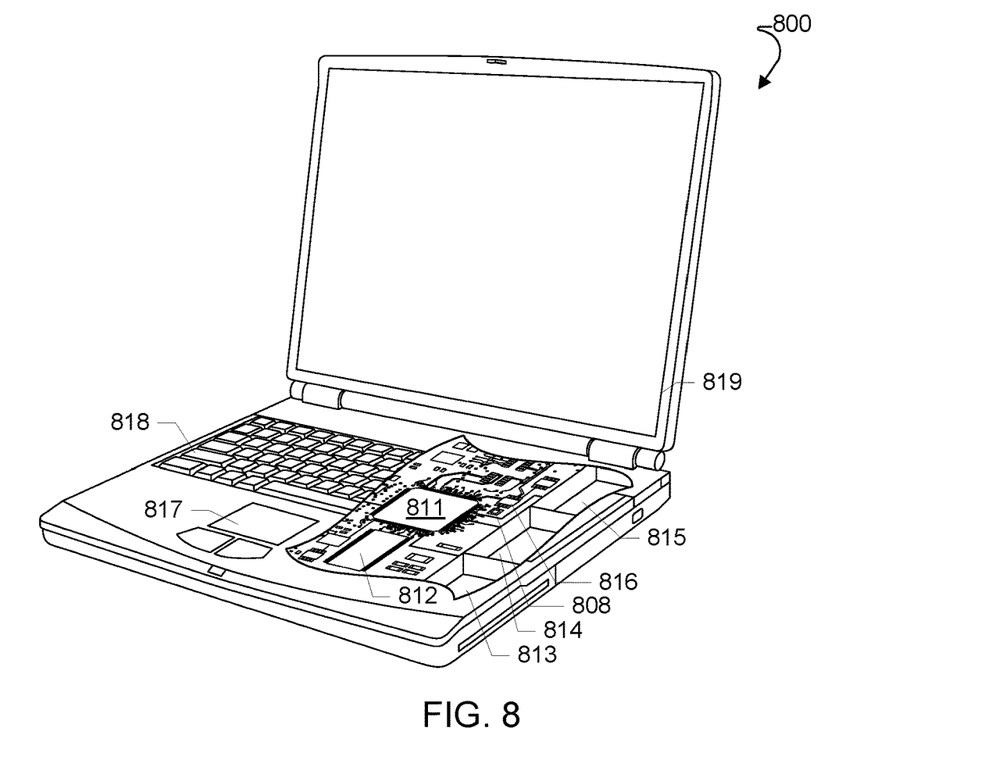
FIG. 8 is a component block diagram illustrating an example computing device suitable for use with the various embodiments.

The various embodiments (including, but not limited to, embodiments described above with reference to FIGS. 1-6) may be implemented in a wide variety of computing devices include a laptop computer 800 an example of which is illustrated in FIG. 8. Many laptop computers include a touchpad touch surface 817 that serves as the computer's pointing device, and thus may receive drag, scroll, and flick gestures similar to those implemented on computing devices equipped with a touch screen display and described above. A laptop computer 800 will typically include a processor 811 coupled to volatile memory 812 and a large capacity non-volatile memory, such as a disk drive 813 of Flash memory. Additionally, the computer 800 may have one or more antenna 808 for sending and receiving electromagnetic radiation that may be connected to a wireless data link and/or cellular telephone transceiver 816 coupled to the processor 811. The computer 800 may also include a floppy disc drive 814 and a compact disc (CD) drive 815 coupled to the processor 811. In a notebook configuration, the computer housing includes the touchpad 817, the keyboard 818, and the display 819 all coupled to the processor 811. Other configurations of the computing device may include a computer mouse or trackball coupled to the processor (e.g., via a USB input) as are well known, which may also be used in conjunction with the various embodiments.

Figure 9:
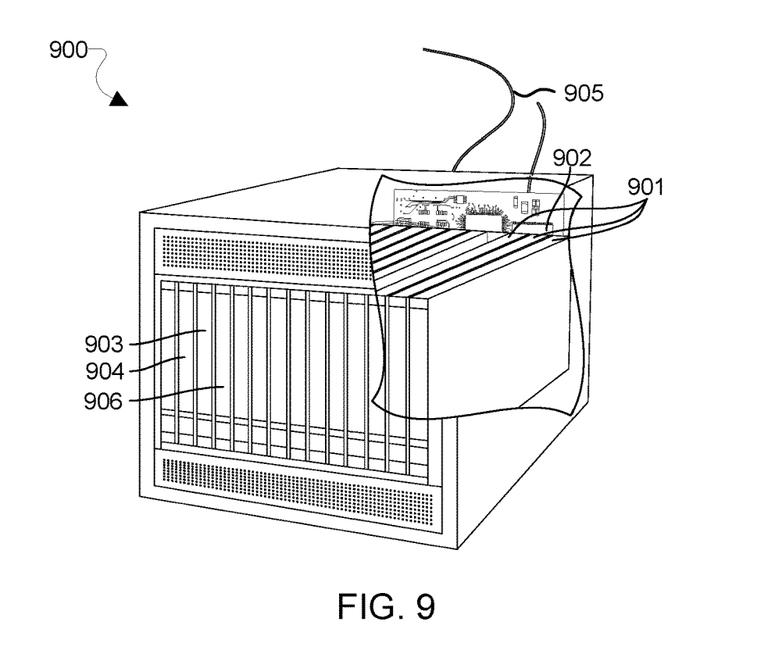
FIG. 9 is a component block diagram illustrating an example server suitable for use with the various embodiments.

The various embodiments (including, but not limited to, embodiments described above with reference to FIGS. 1-6) may also be implemented in fixed computing systems, such as any of a variety of commercially available servers. An example server 900 is illustrated in FIG. 9. Such a server 900 typically includes one or more multicore processor assemblies 901 coupled to volatile memory 902 and a large capacity nonvolatile memory, such as a disk drive 904. As illustrated in FIG. 9, multicore processor assemblies 901 may be added to the server 900 by inserting them into the racks of the assembly. The server 900 may also include a floppy disc drive, compact disc (CD) or digital versatile disc (DVD) disc drive 906 coupled to the processor 901. The server 900 may also include network access ports 903 coupled to the multicore processor assemblies 901 for establishing network interface connections with a network 905, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various embodiments may be written in a high-level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method of improving voice command recognition, comprising:
    applying an acoustic model to a general speech dataset to generate a statistical pronunciation dictionary, wherein the statistical pronunciation dictionary comprises variations of each utterance in the general speech dataset with corresponding maximum probability decoding;
    generating an augmented grammar candidate set based on the statistical pronunciation dictionary and an original grammar set, wherein:
        the original grammar set comprises predefined voice commands to be recognized; and
        each element of the augmented grammar candidate set comprises a variation of one of the predefined voice commands to be recognized, wherein the variation is obtained by replacing one of the predefined voice commands, from the original grammar set, by corresponding variations based on the maximum probability decoding in the statistical pronunciation dictionary; and
    generating an augmented grammar set by adding one or more elements of the augmented grammar candidate set to the original grammar set.

2. The method of claim 1, wherein applying an acoustic model to a general speech dataset to generate a statistical pronunciation dictionary comprises:
    obtaining a greedy decoding sequence for each utterance in the general speech dataset;
    calculating a minimum-edit-path of a corresponding ground-truth to the greedy decoding sequence; and
    obtaining a mapping of each utterance to the corresponding maximum probability decoding.

3. The method of claim 1, wherein applying an acoustic model to a general speech dataset to generate a statistical pronunciation dictionary comprises:
    obtaining one or more sequences from beam-searching algorithms;
    calculating a minimum-edit-path of a corresponding ground-truth to the obtained one or more sequences; and
    obtaining a mapping of each utterance to the corresponding maximum probability decoding.

4. The method of claim 1, further comprising determining a command recognition accuracy, a false-alarm rate, and a mis-detection rate for each element of a given augmented grammar candidate set comprising the variation of one of the predefined voice commands to be recognized.

5. The method of claim 4, wherein determining a command recognition accuracy, a false-alarm rate, and a mis-detection rate for each element of a given augmented grammar candidate set comprises:
    determining the command recognition accuracy for each element of the augmented grammar candidate set based on a command-specific data set, the command-specific data set comprising, for each element of the augmented grammar candidate set, an audio waveform and a corresponding target command; and
    determining the false-alarm rate for each element of the augmented grammar candidate set based on an out-of-domain data set comprising a set of utterances that do not correspond to any one of the predefined voice commands to be recognized.

6. The method of claim 1, wherein generating an augmented grammar set by adding one or more elements of the augmented grammar candidate set to the original grammar set comprises selecting the one or more elements of the augmented grammar candidate set utilizing a method selected from one of:
    a naïve greedy search;
    a greedy search with refinement; or
    a beam-search, and
    wherein the selected one or more elements of the augmented grammar candidate set has a particular weighted sum of a mis-detection rate and a mis-classification rate with a fixed false-alarm target.

7. The method of claim 1, wherein generating an augmented grammar set by adding one or more elements of the augmented grammar candidate set to the original grammar set comprises selecting the one or more elements of the augmented grammar candidate set utilizing a cross entropy method.

8. A computing device, comprising:
    a memory; and
    a processor coupled to the memory and configured with processor executable instructions to perform operations comprising:
        applying an acoustic model to a general speech dataset to generate a statistical pronunciation dictionary, wherein the statistical pronunciation dictionary comprises variations of each utterance in the general speech dataset with corresponding maximum probability decoding;
        generating an augmented grammar candidate set based on the statistical pronunciation dictionary and an original grammar set, wherein:
            the original grammar set comprises predefined voice commands to be recognized; and
            each element of the augmented grammar candidate set comprises a variation of one of the predefined voice commands to be recognized, wherein the variation is obtained by replacing one of the predefined voice commands, from the original grammar set, by corresponding variations based on the maximum probability decoding in the statistical pronunciation dictionary; and
        generating an augmented grammar set by adding one or more elements of the augmented grammar candidate set to the original grammar set.

9. The computing device of claim 8, wherein the processor is configured with processor-executable instructions to perform operations such that applying an acoustic model to a general speech dataset to generate a statistical pronunciation dictionary comprises:
    obtaining a greedy decoding sequence for each utterance in the general speech dataset;
    calculating a minimum-edit-path of a corresponding ground-truth to the greedy decoding sequence; and
    obtaining a mapping of each utterance to the corresponding maximum probability decoding.

10. The computing device of claim 8, wherein the processor is configured with processor-executable instructions to perform operations such that applying an acoustic model to a general speech dataset to generate a statistical pronunciation dictionary comprises:
    obtaining one or more sequences from beam-searching algorithms;
    calculating a minimum-edit-path of a corresponding ground-truth to the obtained one or more sequences; and
    obtaining a mapping of each utterance to the corresponding maximum probability decoding.

11. The computing device of claim 8, wherein the processor is configured with processor-executable instructions to perform operations further comprising determining a command recognition accuracy, a false-alarm rate, and a mis-detection rate for each element of a given augmented grammar candidate set comprising the variation of one of the predefined voice commands to be recognized.

12. The computing device of claim 11, wherein the processor is configured with processor-executable instructions to perform operations such that determining a command recognition accuracy, a false-alarm rate, and a mis-detection rate for each element of a given augmented grammar candidate set comprises:
    determining the command recognition accuracy for each element of the augmented grammar candidate set based on a command-specific data set, the command-specific data set comprising, for each element of the augmented grammar candidate set, an audio waveform and a corresponding target command; and
    determining the false-alarm rate for each element of the augmented grammar candidate set based on an out-of-domain data set comprising a set of utterances that do not correspond to any one of the predefined voice commands to be recognized.

13. The computing device of claim 8, wherein the processor is configured with processor-executable instructions to perform operations such that generating an augmented grammar set by adding one or more elements of the augmented grammar candidate set to the original grammar set comprises selecting the one or more elements of the augmented grammar candidate set utilizing a method selected from one of:
    a naïve greedy search;
    a greedy search with refinement; or
    a beam-search, and
    wherein the selected one or more elements of the augmented grammar candidate set has a particular weighted sum of a mis-detection rate and a mis-classification rate with a fixed false-alarm target.

14. The computing device of claim 8, wherein the processor is configured with processor-executable instructions to perform operations such that generating an augmented grammar set by adding one or more elements of the augmented grammar candidate set to the original grammar set comprises selecting the one or more elements of the augmented grammar candidate set utilizing a cross entropy method.

15. A computing device, comprising:
    a memory;
    means for applying an acoustic model to a general speech dataset to generate a statistical pronunciation dictionary, wherein the statistical pronunciation dictionary comprises variations of each utterance in the general speech dataset with corresponding maximum probability decoding;
    means for generating an augmented grammar candidate set based on the statistical pronunciation dictionary and an original grammar set, wherein:
        the original grammar set comprises predefined voice commands to be recognized; and
        each element of the augmented grammar candidate set comprises a variation of one of the predefined voice commands to be recognized, wherein the variation is obtained by replacing one of the predefined voice commands, from the original grammar set, by corresponding variations based on the maximum probability decoding in the statistical pronunciation dictionary; and
    means for generating an augmented grammar set by adding one or more elements of the augmented grammar candidate set to the original grammar set.

16. A non-transitory processor-readable medium having stored thereon processor-executable instructions configured to cause a processor to perform operations comprising:
    applying an acoustic model to a general speech dataset to generate a statistical pronunciation dictionary, wherein the statistical pronunciation dictionary comprises variations of each utterance in the general speech dataset with corresponding maximum probability decoding;
    generating an augmented grammar candidate set based on the statistical pronunciation dictionary and an original grammar set, wherein:
        the original grammar set comprises predefined voice commands to be recognized; and
        each element of the augmented grammar candidate set comprises a variation of one of the predefined voice commands to be recognized, wherein the variation is obtained by replacing one of the predefined voice commands, from the original grammar set, by corresponding variations based on the maximum probability decoding in the statistical pronunciation dictionary; and
    generating an augmented grammar set by adding one or more elements of the augmented grammar candidate set to the original grammar set.

17. The non-transitory processor-readable medium of claim 16, wherein the stored processor-executable instructions are configured to cause a processor to perform operations such that applying an acoustic model to a general speech dataset to generate a statistical pronunciation dictionary comprises:
    obtaining a greedy decoding sequence for each utterance in the general speech dataset;
    calculating a minimum-edit-path of a corresponding ground-truth to the greedy decoding sequence; and
    obtaining a mapping of each utterance to the corresponding maximum probability decoding.

18. The non-transitory processor-readable medium of claim 16, wherein the stored processor-executable instructions are configured to cause a processor to perform operations such that applying an acoustic model to a general speech dataset to generate a statistical pronunciation dictionary comprises:
    obtaining one or more sequences from beam-searching algorithms;
    calculating a minimum-edit-path of a corresponding ground-truth to the obtained one or more sequences; and
    obtaining a mapping of each utterance to the corresponding maximum probability decoding.

19. The non-transitory processor-readable medium of claim 16, wherein the stored processor-executable instructions are configured to cause a processor to perform operations determining a command recognition accuracy, a false-alarm rate, and a mis-detection rate for each element of a given augmented grammar candidate set comprising the variation of one of the predefined voice commands to be recognized.

20. The non-transitory processor-readable medium of claim 19, wherein the stored processor-executable instructions are configured to cause a processor to perform operations such that determining a command recognition accuracy, a false-alarm rate, and a mis-detection rate for each element of a given augmented grammar candidate set comprises:
   determining the command recognition accuracy for each element of the augmented grammar candidate set based on a command-specific data set, the command-specific data set comprising, for each element of the augmented grammar candidate set, an audio waveform and a corresponding target command; and
   determining the false-alarm rate for each element of the augmented grammar candidate set based on an out-of-domain data set comprising a set of utterances that do not correspond to any one of the predefined voice commands to be recognized.

21. The non-transitory processor-readable medium of claim 16, wherein the stored processor-executable instructions are configured to cause a processor to perform operations such that generating an augmented grammar set by adding one or more elements of the augmented grammar candidate set to the original grammar set comprises selecting the one or more elements of the augmented grammar candidate set utilizing a method selected from one of:
   a naïve greedy search;
   a greedy search with refinement; or
   a beam-search, and
   wherein the selected one or more elements of the augmented grammar candidate set has a particular weighted sum of a mis-detection rate and a mis-classification rate with a fixed false-alarm target.

22. The non-transitory processor-readable medium of claim 16, wherein the stored processor-executable instructions are configured to cause a processor to perform operations such that generating an augmented grammar set by adding one or more elements of the augmented grammar candidate set to the original grammar set comprises selecting the one or more elements of the augmented grammar candidate set utilizing a cross entropy method.

* * * * *